Figure 1:
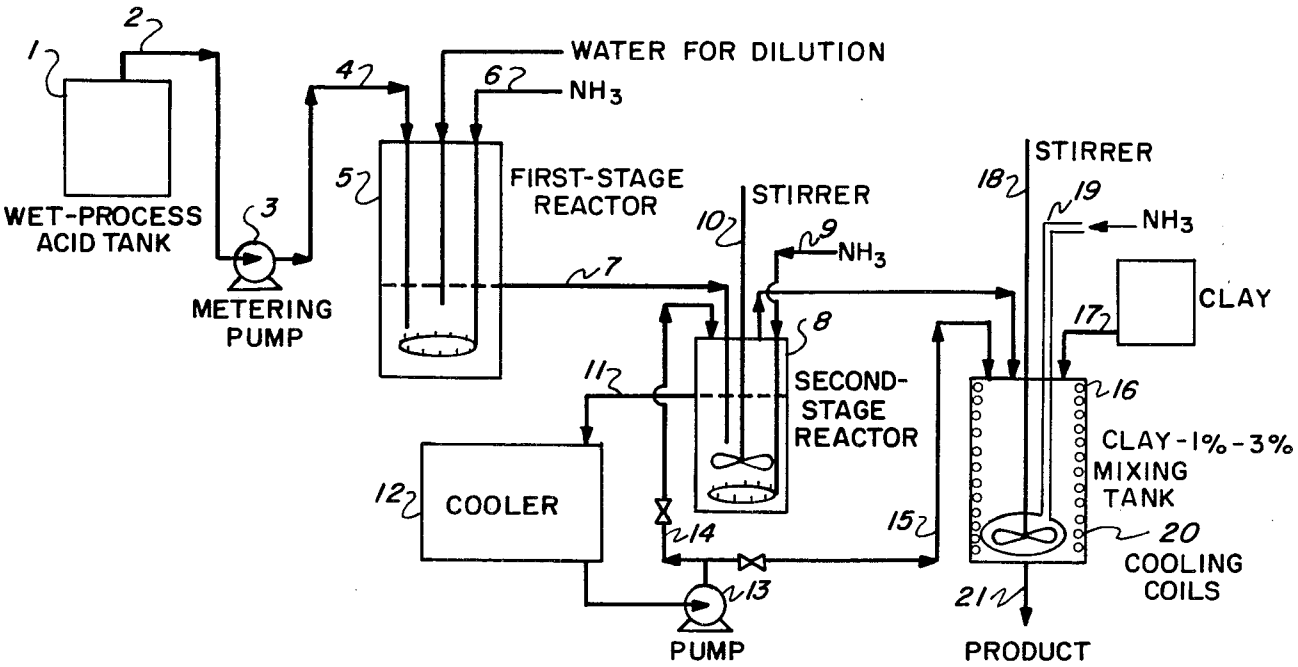
Figure 2:
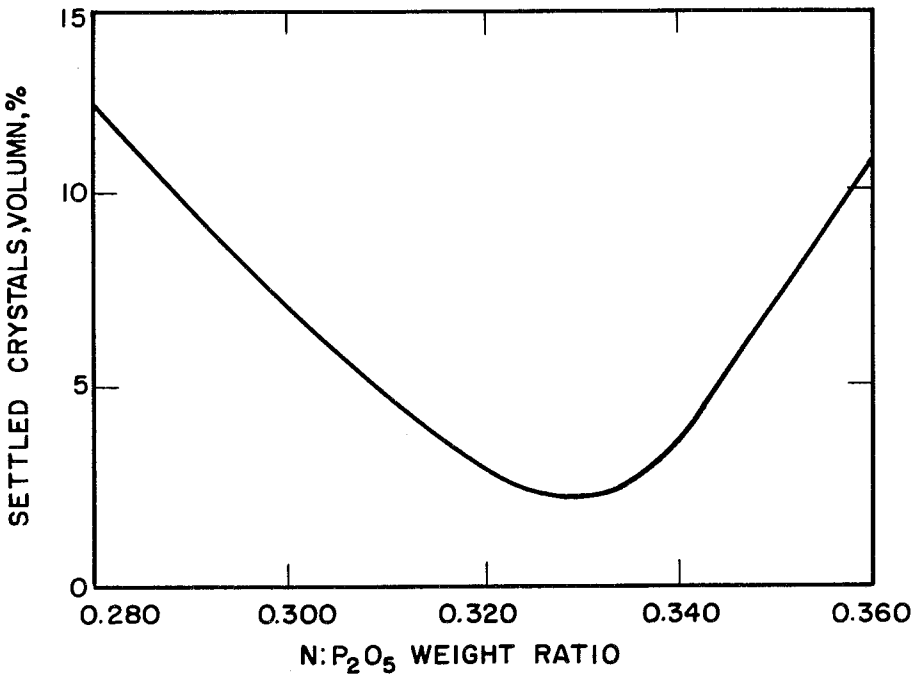
Figure 3:
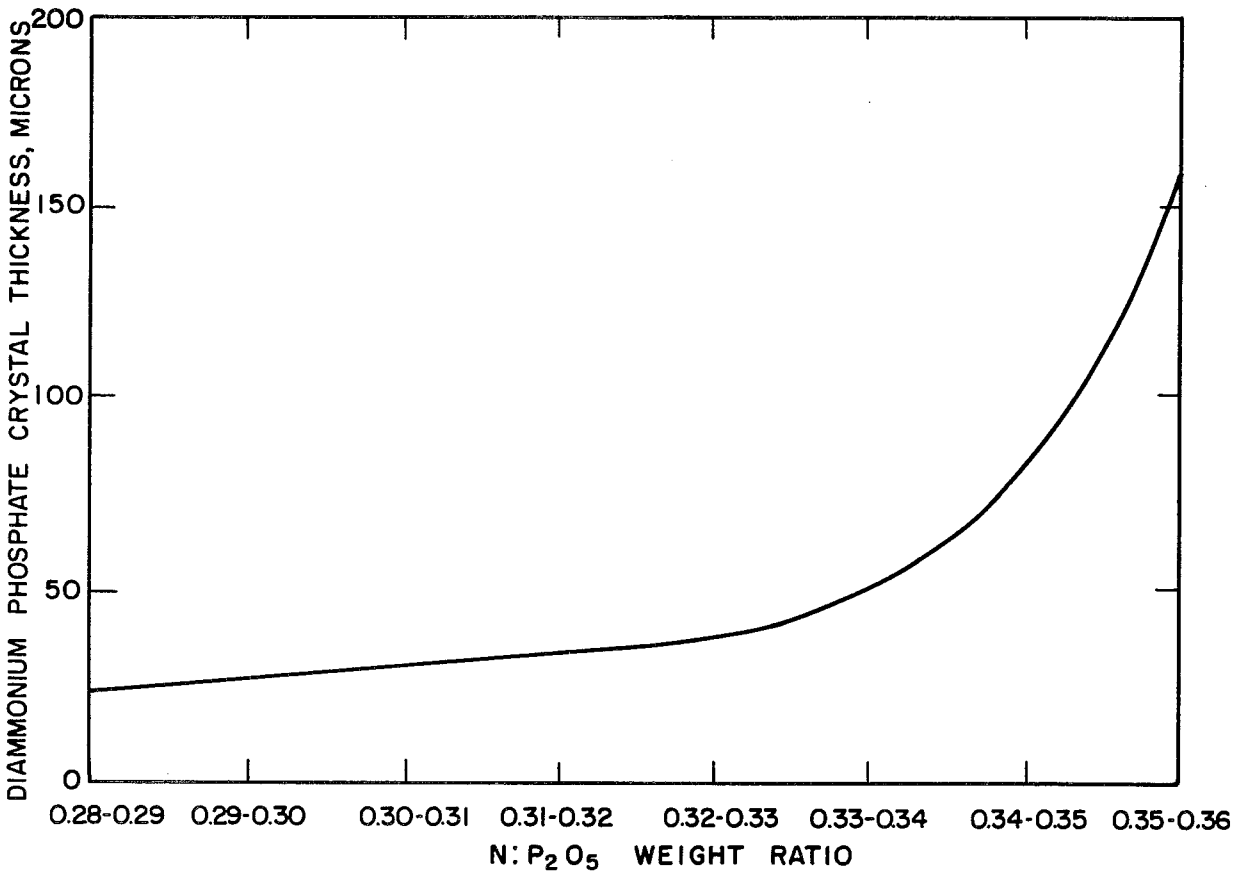

United States Defensive Publication [19] (H) [11] T959,001

Jones [43] June 7, 1977

[54] PRODUCTION OF SUSPENSION FERTILIZERS FROM WET-PROCESS ORTHOPHOSPHORIC ACIDS

[75] Inventor: Thomas M. Jones, Sheffield, Ala.

[73] Assignee: Tennessee Valley Authority

[21] Appl. No.: 702,209

[22] Filed: July 2, 1976

[51] Int. Cl.[2] ..... C05B 7/00

[52] U.S. Cl. ..... 71/34; 71/43; 71/64 C

[57] ABSTRACT

A process for preparing concentrated, high-grade, nitrogen-phosphate ($N—P_2O_5$) base suspension fertilizer from wet-process or other impure orthophosphoric acids. The process involves a new procedure for the direct ammoniation of orthophosphoric acid in stages for production of fluid, high-analysis, $N—P_2O_5$ suspension fertilizer with good physical properties. The new process contains a novel method for prevention of settling of crystals in the suspension during vibration, such as that which occurs during shipment. Settling is avoided by producing small, thin crystals of diammonium phosphate through control of the $N:P_2O_5$ ratio and temperature in the second and third ammoniation stages.

6 Claims, 3 Sheets Drawing,

27 Pages Specification

The file of this unexamined application may be inspected and copies thereof may be purchased (849 O.G. 1221, Apr. 9, 1968).

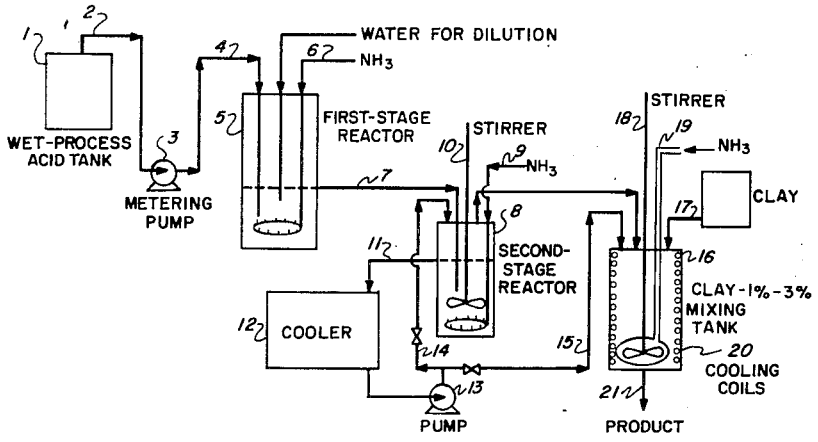

PRODUCTION OF AMMONIUM PHOSPHATE SUSPENSION FERTILIZERS BY A TWO-STAGE CONTINUOUS AMMONIATION PROCESS

PRODUCTION OF AMMONIUM PHOSPHATE SUSPENSION FERTILIZERS BY A TWO-STAGE CONTINUOUS AMMONIATION PROCESS

EFFECT OF N:$P_2O_5$ RATIO ON SETTING OF CRYSTALS IN SUSPENSIONS PREPARED BY THE TWO-STAGE PROCESS DURING THE VIBRATION TEST

EFFECT OF N: $P_2O_5$ RATIO ON THICKNESS OF DIAMMONIUM PHOSPHATE IN ORTHOPHOSPHATE BASE SUSPENSION MADE FROM WET-PROCESS ACID